United States Patent [19]
Tokushima et al.

[11] Patent Number: 5,645,355
[45] Date of Patent: Jul. 8, 1997

[54] BEARING UNIT

[75] Inventors: Hidekazu Tokushima, Matsudo; Motohiro Miyasaka, Nagareyama; Michihiro Aizawa; Hideo Shikata, both of Matsudo; Katsutoshi Nii, Hitachi, all of Japan

[73] Assignees: Hitachi, Ltd., Tokyo; Hitachi Powdered Metals Co., Ltd., Matsudo, both of Japan

[21] Appl. No.: 656,912

[22] Filed: Jun. 3, 1996

[30] Foreign Application Priority Data

Jun. 5, 1995 [JP] Japan ................................ 7-138118

[51] Int. Cl.$^6$ ................................................ F16C 17/02
[52] U.S. Cl. .................... 384/133; 384/279; 384/397; 384/398; 384/446; 384/902
[58] Field of Search ................................ 384/133, 279, 384/902, 446, 397, 398

[56] References Cited

U.S. PATENT DOCUMENTS

| 4,754,181 | 6/1988 | Mizobuchi et al. | 384/610 |
| 5,161,900 | 11/1992 | Bougathou et al. | 384/133 |

*Primary Examiner*—Lenard A. Footland
*Attorney, Agent, or Firm*—Antonelli, Terry, Stout & Kraus, LLP

[57] ABSTRACT

A bearing unit in which two oil sintered slide bearings are fitted in a bearing space of non-magnetic bearing housings to be spaced away from each other and a magnetic fluid is interposed between a rotary shaft and the oil sintered slide bearings to rotatably support the rotary shaft. The rotary shaft is made from a material having permeability, and a ring-shaped permanent magnet is fixedly provided between the two oil sintered slide bearings to be spaced therefrom. The magnetic fluid is held between the two oil sintered slide bearings to be circulated.

6 Claims, 2 Drawing Sheets

1

BEARING UNIT

BACKGROUND OF THE INVENTION

1. Field of the Invention

The present invention relates to a bearing unit in which a magnetic fluid is used as a lubricant, and more particularly to a bearing unit suitable for motors for audio equipment, motors for video equipment, polygon motors for laser scanners, fan motors for air-conditioning equipment, spindle motors for magnetic disk drives, and other motors which are required to cause no contamination of the equipment due to leakage of a lubricant and further to satisfy the requirements on less noises, high-speed and high-accuracy rotations.

2. Description of the Prior Art

As a bearing unit for general small size motors there has been known a rolling bearing or a slide bearing using air or an oil as its lubricant. In the fields including audio equipment, video equipment, laser beam printers, magnetic disk units and air-conditioning equipment, in keeping with the improvements of product qualities and multifunctions, their motors are being required to meet the requirements on high-speed and high-accuracy operations. As for the improvement of the high-speed performance, for example, there have been made the approaches to increase the speed of a cylinder motor for a VTR from 1800 rpm up to 10000 rpm, the speed of a polygon mirror motor for laser scanners from several thousands rpm up to several ten-thousands rpm, and the speed of a spindle motor for magnetic disk drives from 3600 rpm up to 10000 rpm. In addition to these requirements, these motors have been exposed to the requirements on high rotational accuracy. However, it is difficult for rolling bearings to accommodate such a high-speed rotation in terms of the rotational accuracy. For this reason, slide bearings of fluid lubrication type has come into practical use.

On the other hand, such equipment can not accept oil leakage from the bearing, so that it strictly requires a great ability of the oil seal. The slide bearing using an oil lubrication can be expected to exhibit a high rotational accuracy because of having an excellent bearing rigidity and an excellent dumping property, though contamination is unavoidable due to oil leakage and oil mist. To solve this contamination problem, there has been proposed a magnetic fluid bearing in which a magnetic fluid is employed for its lubrication and seal. Japanese Unexamined Patent Publication No. 59-126114 proposes a magnetic fluid bearing constructed such that a magnetic fluid is impregnated into an oil sintered bearing of a porous material and held on a sliding surface by means of a permanent magnet to maintain the fluid lubrication as well as to provide a sealing function.

A magnetic fluid bearing, in which a magnetic circuit uses a permanent magnet to hold a magnetic fluid, is such that the magnetic fluid impregnated expands due to temperature rise of the bearing caused by its high-speed revolution and hence exudes, which increases a centrifugal force applied to the magnetic fluid exuded from the bearing. For this reason, there is a possibility that the magnetic fluid may scatter from the bearing section and the seal portion. In addition, temperature rise of the bearing section causes the magnetic fluid and air within the bearing unit and others to expand to raise the pressure within the bearing unit. This requires the use of sealing structure capable of standing this pressure rise, and ordinary magnetic fluid seals can result in the lubricating oil exuding and scattering from the sealing section at a high-speed rotation. Moreover, ordinary porous oil sintered slide bearings fail to supply a sufficient amount of lubricant onto sliding surfaces, thus making it difficult to keep high-accuracy rotations. Accordingly, to apply the magnetic fluid bearing unit to the above-mentioned motors, there is a necessity to provide a sealing structure and an oil supply mechanism which can accommodate high-speed rotations.

SUMMARY OF THE INVENTION

The present invention has been developed with a view to eliminating the above-described problems, and it is therefore an object of the present invention to provide a bearing unit for small size motors which is capable of maintaining a high-accuracy rotation in a wide range from a low-speed rotation to a high-speed rotation and hermetically sealing the magnetic fluid certainly.

In accordance with an aspect of this invention, there is provided a bearing unit in which two oil sintered slide bearings are fitted with a given separation within a non-magnetic bearing housing and a magnetic fluid is interposed between a rotary shaft and the oil sintered slide bearings to rotatably support the rotary shaft, wherein the rotary shaft is made from a permeability material and a ring-like permanent magnet is fixedly provided between the two oil sintered slide bearings to be spaced therefrom.

Preferably, a ring-like member made from a porous material having a pore diameter greater than that of the oil sintered slide bearings is disposed outside the oil sintered slide bearings to come closely into contact with the oil sintered slide bearings.

The ring-like permanent magnet magnetizes the rotary shaft of permeability so that the magnetic fluid is attracted onto the surface of the rotary shaft to excellently lubricate the sliding surfaces between the rotary shaft and the slide bearings either in its start-up condition or in its low-speed rotating condition. In addition, this permanent magnet attracts the magnetic fluid discharged from the oil sintered slide bearings due to self-heating of the oil sintered slide bearings upon the revolution of the rotary shaft. The magnetic fluid attracted by the permanent magnet is acted by a centrifugal force generated by the rotary shaft to be pushed back to be transferred to the oil sintered slide bearings. The magnetic fluid transferred is sucked into the oil sintered slide bearings by virtue of the capillarity phenomenon in the oil sintered slide bearings. Owing to the repeated attraction by the permanent magnet and action of the centrifugal force, the magnetic fluid is gathered about the central portion of the bearing unit to prevent leakage and to be circulated and supplied to the slide bearing sections.

Furthermore, spaces defined between the ring-shaped permanent magnet and the oil sintered slide bearings can keep the magnetic fluid, which cannot be absorbed by the oil sintered slide bearings, to ensure that lubrication on the sliding surfaces be provided for the self circulation oil supply and hermetical sealing be provided.

Still further, the ring-like porous member absorbs the magnetic fluid leaked to the outside of the oil sintered slide bearings and then returns it to the oil sintered slide bearings, thus maintaining the lubrication by the magnetic fluid and preventing oil leakage and oil scatter.

Moreover, the oil sintered slide bearings, shaped into a predetermined configuration and press fitted into the bearing housing by means of a sizing pin, can be assembled with a dimensional accuracy on the order of μm for inner diameter and roundness. Further, the bearing housings, in which the oil sintered slide bearings formed to have such a given configuration and dimension are fitted, can be fitted over or adhered to the both ends of the rotary shaft provided with the fixed permanent magnet to construct the bearing unit, and the spaces between the oil sintered slide bearings and the permanent magnet can easily be set on the basis of the dimension of the bearing housing. In addition, since the pore distributions in the inner surfaces of the bearings are adjustable upon press fitting of the bearings, a high dimensional accuracy is obtainable and the content of the magnetic fluid is adjustable, thus providing a bearing unit conformed to the high-speed and high-accuracy rotating operations.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
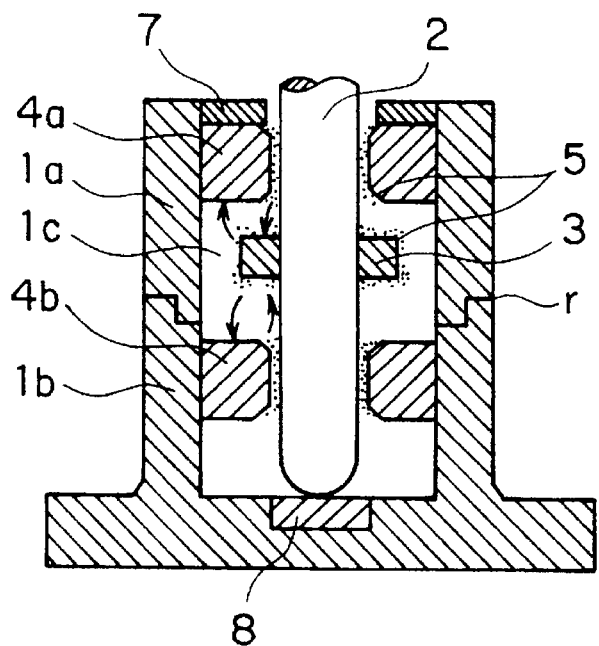
FIG. 1 is a longitudinal side cross-sectional view showing a bearing unit according to an embodiment of the present invention.

FIG. 1 is a longitudinal side cross-sectional view showing a bearing unit according to an embodiment of the present invention. Two divided sections, i.e., non-magnetic bearing housing sections 1a, 1b, define a bearing space 1c with one end open and the other end closed. The bearing housing section 1a has an oil sintered slide bearing (made of a porous material) 4a containing a magnetic fluid 5 and a ring-shaped washer 7 fitted therein, while the bearing housing section 1b has an oil sintered slide bearing 4b containing the magnetic fluid 5 and a thrust pad 8 fitted therein. A rotary shaft 2 made of a material having permeability is rotatably supported by the oil sintered slide bearings 4a and 4b and a ring-shaped permanent magnet 3 is fitted onto the outer circumference of the rotary shaft 2. The two oil sintered slide bearings 4a and 4b are spaced away from each other to interpose therebetween the permanent magnet 3 with spacings from the two oil sintered slide bearings 4a and 4b. In addition, a thrust load is born by a thrust pad 8, against which a tip portion of the rotary shaft 2 abuts.

In the bearing unit thus constructed, a proper amount of magnetic fluid 5 given as a lubricant in advance is attracted and kept by the permanent magnet 3. Further, the magnetic fluid 5 impregnated or soaked into the oil sintered slide bearings 4a and 4b, together with the magnetic fluid 5 supplied around the permanent magnet 3, is, as shown in FIG. 1, magnetized together with the rotary shaft 3 by means of the permanent magnet 3 to be held around the slide bearings 4a, 4b and the thrust pad 8.

Accordingly, in this bearing unit, the magnetic fluid 5 is attracted by the rotary shaft 3 in a low-speed rotating condition to act in fluid lubrication. On the other hand, in a high-speed rotating condition, the impregnated magnetic fluid 5 expands in volume due to self-heating of the oil sintered slide bearings 4a and 4b to exude therefrom and move in directions shown by arrows in the drawing to be attracted by the permanent magnet 3. As the magnetic fluid 5 attracted by the permanent magnet 3 is pushed back to the outer peripheral portion by a centrifugal force of the rotary shaft 2, the oil sintered slide bearings 4a and 4b disposed on both sides of the permanent magnet 3 with a spacing therebetween are wetted at end surfaces thereof by the magnetic fluid 5 discharged, so that an amount of magnetic fluid 5 corresponding to an amount exuded from the oil sintered slide bearings 4a and 4b is absorbed into the oil sintered slide bearings 4a and 4b due to their capillarity phenomenon. Thus, the exudation of the magnetic fluid 5 balances with the absorption thereof, with the result that supplying of the magnetic fluid (lubricant) 5 to the oil sintered slide bearings 4a and 4b is repeated in a self-circulating manner.

Accordingly, in the bearing unit as shown as an embodiment in FIG. 1, the sliding surfaces of the oil sintered slide bearings 4a and 4b are wetted by the magnetic fluid 5 in a condition from a still state to a high-speed rotating state, and hence the bearing unit stably operates in fluid lubrication, so that a high rotational accuracy is attainable in a wide range from a low-speed rotation to a high-speed rotation. In addition, fluid lubrication is attained on the sliding surface of the thrust pad 8 because the rotary shaft 2 is magnetized to cause even a pivot portion at the tip portion of the rotary shaft 2 to attract the magnetic fluid 5 at all times.

In this embodiment, as shown in FIG. 1 the bearing housing sections 4a and 4b are combined to make a single bearing housing assembly in such a way that stepped fitting portions r formed at end portions of the bearing housing sections are butt joined to each other. Accordingly, spacings between the oil sintered slide bearings 4a, 4b and the permanent magnet 3 can be determined by the dimensions of the bearing housing sections 1a and 1b, and the oil sintered slide bearings 4a and 4b are adapted for mass production without the need of machining. As a result, the assembling work and the manufacturing cost are suppressed to provide products at reduced costs.

Figure 2:
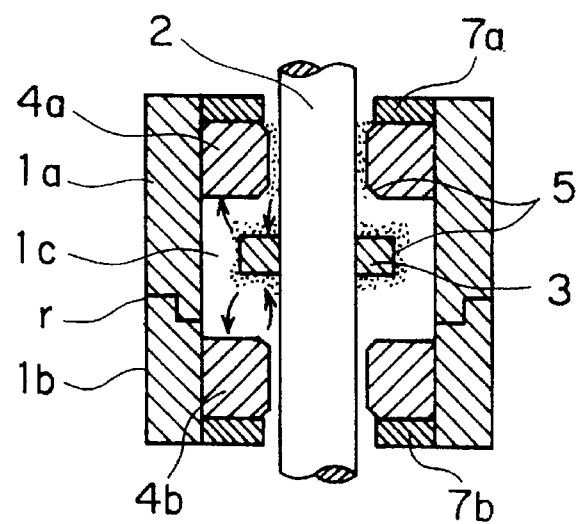
FIG. 2 is a longitudinal side cross-sectional view showing a bearing unit according to another embodiment of this invention.

FIG. 2 is an illustration of another embodiment of this invention, showing a shaft through type bearing unit, in which bearing housing sections 1a and 1b define a bearing space open at both end portions. An arrangement of oil sintered slide bearings 4a, 4b and a permanent magnet 3 is the same as that of the embodiment in the FIG. 1. In this embodiment, leakage of a magnetic fluid 5 from the bearing unit can be suppressed in a similar manner to that in the aforesaid embodiment, so that a thrust pad can be placed outside the bearing housing assembly, a load such as a VTR cylinder and a magnetic disk can be attached to one end of a rotary shaft 2 and a rotor or pulley can be attached to the other end of the shaft to make a suitable connection with a driving device.

Figure 3:
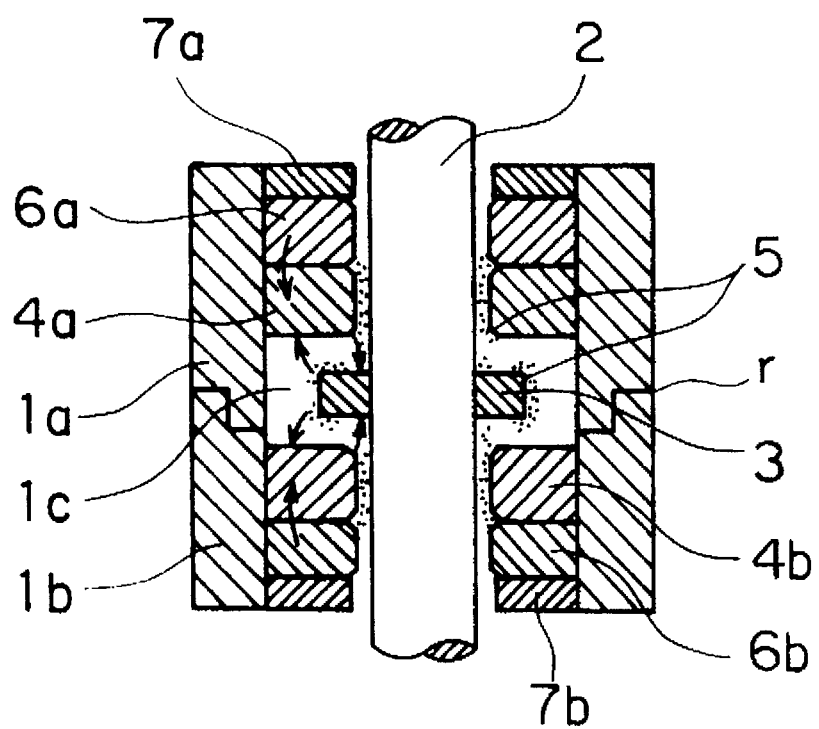
FIG. 3 is a longitudinal side cross-sectional view showing a bearing unit according to a further embodiment of this invention.

FIG. 3 is an illustration of a further embodiment, showing a bearing unit which can further improve the self-circulation oil supply performance and the sealing performance as compared with the bearing unit of the FIG. 2 embodiment. The embodiment shown in FIG. 3 is different from the FIG. 2 embodiment in that porous felt metals 6a and 6b having pores larger in diameter than those of the oil sintered slide bearings 4a and 4b are disposed to cause the outer side surfaces of the oil sintered slide bearings 4a and 4b to come closely into contact with end portions of the bearing housing sections 1a and 1b.

The porous felt metals 6a and 6b having the larger-diameter pores absorb the magnetic fluid 5 which is exuded from the oil sintered slide bearings 4a, 4b due to temperature rise thereof caused by high-speed rotations of the rotary shaft 2 and cannot be not absorbed by the oil sintered slide bearings 4a, 4b. Further, since the pores of the oil sintered slide bearings 4a, 4b are smaller in diameter than those of the felt metals 6a, 6b and the oil sintered slide bearings 4a, 4b are brought closely into contact with the felt metals 6a, 6b, the magnetic fluid 5 absorbed by the porous felt metals 6a and 6b is absorbed by the oil sintered slide bearings 4a, 4b as shown by arrows in the drawings when the oil sintered slide bearings 4a, 4b afford to additionally absorb the magnetic fluid 5. This makes use of a phenomenon that, when two kinds of porous members having different pore diameters are impregnated with a fluid to be brought closely into contact with each other, the fluid tends to flow from the larger-pore member to the smaller-pore member but does not flow reversely.

Therefore, as in this embodiment, when the porous felt metals 6a and 6b having the larger-diameter pores are placed closely in contact with the oil sintered slide bearings 4 and 4b having the smaller-diameter pores, the magnetic fluid 5 leaking outside of the oil sintered slide bearings 4a and 4b is absorbed and held by the porous felt metals 6a and 6b to be prevented from leaking outside and scattering, and when the oil sintered slide bearings 4a and 4b afford to additionally accept the magnetic fluid 5, the magnetic fluid 5 returns to the oil sintered slide bearings 4a and 4b. Moreover, as well as in the aforesaid embodiments, the permanent magnet 3 promotes the self-circulation oil supply inside of the oil sintered slide bearings 4a and 4b to surely prevent the leakage of the magnetic fluid 5.

Furthermore, washers 7a and 7b situated outside the porous felt metals 6a and 6b greatly reduce evaporation of the oil component of the magnetic fluid 5. In particular, since in the FIG. 3 embodiment the areas of the end surfaces of the felt metals 6a and 6b serve as evaporating areas, the washers 7a and 7b provided outside them prevent the service life of the magnetic fluid 5 from shortening due to the evaporation, and thus improve its reliability.

The above-stated operations positively keep the lubrication and sealing in a range of rotation from low-speed rotation to high-speed rotation to enable rotation of high accuracy.

Still further, in assembling the bearing units according to this invention, in order to improve the dimensional accuracy, the oil sintered slide bearings 4a and 4b formed to be shaped into predetermined configurations are first press fitted into the bearing housing sections 1a and 1b by means of a sizing pin. This method enables assembling with an accuracy on the order of μm both in roundness and inner diameter. After the oil sintered slide bearings 4a and 4b are press fitted in the bearing housing sections 1a and 1b with accuracy in this way, the bearing housing sections 1a and 1b are made to be fitted in or adhered to each other from sides of the both end portions of the rotary shaft 2 to which the permanent magnet 3 is fixedly secured.

Thus, spacings between the oil sintered slide bearings 4a, 4b and the permanent magnet 3 can be set on the basis of the dimensions of the bearing housing sections 1a and 1b. Further, since the pores in the inner surfaces of the bearing unit can be adjusted in distribution upon press fitting of the oil sintered slide bearings 4a and 4b, the dimensions of high accuracy are obtained, and the content of the magnetic fluid 5 can be adjusted, thus providing a bearing unit suitable for high-speed and high-accuracy rotation.

According to the present invention, the rotary shaft is made of a material having permeability and the ring-like permanent magnet is fixedly located to be spaced from the two oil sintered slide bearings to retain and circulate the magnetic fluid. Accordingly, high-accuracy rotation can be maintained in a wide range of rotation from low speed to high speed, and positive lubrication and sealing can be effected by the magnetic fluid.

Furthermore, according to the present invention, the ring-shaped members having larger-diameter pores and placed closely into contact with the outside surfaces of the oil sintered slide bearings provide for absorption and holding of the magnetic fluid and supplying thereof to the slide bearings whereby a sealing ability and a lubricating ability can be maintained and the oil leakage prevention and fluid lubrication are also preserved in a wide range of rotation from low-speed rotation to high-speed rotation. Accordingly, the present invention is applied to a VTR cylinder motor and others to enable enhancing performances and functions thereof.

Still further, according to this invention, the sizing processing method for the oil sintered slide bearings is contrived to provide a bearing unit which involves a high dimensional accuracy and is excellent in mass production and suitable for small size motors.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A bearing unit comprising:
   non-magnetic bearing housings;
   a rotary shaft made from a material having permeability and provided within said non-magnetic bearing housings;
   two oil sintered slide bearings fitted in said non-magnetic bearing housings to be spaced away from each other;
   a magnetic fluid interposed between said rotary shaft and said oil sintered slide bearings to rotatably support said rotary shaft, and
   a ring-shaped permanent magnet fixedly provided between said two oil sintered slide bearings to be spaced therefrom.

2. A bearing unit comprising:
   non-magnetic bearing housings to form a bearing space which is open at its one end and closed at its other end;
   a rotary shaft made from a material having permeability and provided within said bearing space of said non-magnetic bearing housings;
   two oil sintered slide bearings fitted in said bearing space of said non-magnetic bearing housings to be spaced away from each other;
   a magnetic fluid interposed between said rotary shaft and said oil sintered slide bearings to rotatably support said rotary shaft, and
   a ring-shaped permanent magnet fixedly provided between said two oil sintered slide bearings to be spaced therefrom.

3. A bearing unit comprising:
   non-magnetic bearing housings to form a bearing space having open ends;
   a rotary shaft made from a material having permeability and provided within said bearing space of said non-magnetic bearing housing;
   two oil sintered slide bearings fitted in said bearing space of said non-magnetic bearing housings to be spaced from each other;

a magnetic fluid interposed between said rotary shaft and said oil sintered slide bearings to rotatably support said rotary shaft, and a ring-shaped permanent magnet fixedly provided between said two oil sintered slide bearings to be spaced therefrom.

4. A bearing unit as defined in one of claims 1 to 3, further comprising at least one ring-shaped member made from a porous material having a pore greater in diameter than that of said oil sintered slide bearings, said ring-shaped member being disposed outside said oil sintered slide bearings to come closely into contact therewith.

5. A bearing unit as defined in one of claims 1 to 3, wherein said oil sintered slide bearings are press fitted in said bearing housings by means of a sizing pin.

6. A bearing unit as defined in one of claims 1 to 3, wherein said bearing housing comprises two split halves, into which said oil sintered slide bearings are respectively press fitted by means of a sizing pin, and then said two split halves are joined to each other from both ends of said rotary shaft to which said permanent magnet is fixedly secured.

* * * * *